(12) United States Patent
Dontcheva et al.

(10) Patent No.: US 11,544,322 B2
(45) Date of Patent: Jan. 3, 2023

(54) FACILITATING CONTEXTUAL VIDEO SEARCHING USING USER INTERACTIONS WITH INTERACTIVE COMPUTING ENVIRONMENTS

(71) Applicants: Adobe Inc., San Jose, CA (US); The Regents of the University of California, Oakland, CA (US)

(72) Inventors: Lubomira Dontcheva, Seattle, WA (US); Kent Andrew Edmonds, San Jose, CA (US); Cristin Fraser, San Diego, CA (US); Scott Klemmer, La Jolla, CA (US)

(73) Assignees: Adobe Inc., San Jose, CA (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 16/389,592

(22) Filed: Apr. 19, 2019

(65) Prior Publication Data
US 2020/0334290 A1    Oct. 22, 2020

(51) Int. Cl.
*G06F 16/732* (2019.01)
*G06F 9/54* (2006.01)
(Continued)

(52) U.S. Cl.
CPC .......... *G06F 16/732* (2019.01); *G06F 3/0484* (2013.01); *G06F 9/451* (2018.02);
(Continued)

(58) Field of Classification Search
CPC ............. G06F 16/732; G06F 16/24575; G06F 16/7844; G06F 16/71; G06F 9/54; G06F 16/739; G06F 16/24578
See application file for complete search history.

(56) References Cited

U.S. PATENT DOCUMENTS 8,504,653 B1 * 8/2013 Commons ........... H04L 67/1097
709/219
9,804,736 B2 * 10/2017 Sutardja ................ G06F 3/0481
(Continued)

OTHER PUBLICATIONS

Cisco Visual Networking Index: Forecast and Trends, 2017-2022 White Paper, Technical Report, Available online at: https://www.cisco.com/c/en/us/solutions/collateral/service-provider/visual-networking-index-vni/white-paper-c11-741490.html, 2017, 38 pages.
(Continued)

*Primary Examiner* — Ariel Mercado
*Assistant Examiner* — Phoebe X Pan
(74) *Attorney, Agent, or Firm* — Kilpatrick Townsend & Stockton LLP

(57) ABSTRACT

A method includes detecting control of an active content creation tool of an interactive computing system in response to a user input received at a user interface of the interactive computing system. The method also includes automatically updating a video search query based on the detected control of the active content creation tool to include context information about the active content creation tool. Further, the method includes performing a video search of video captions from a video database using the video search query and providing search results of the video search to the user interface of the interactive computing system.

20 Claims, 9 Drawing Sheets

(51) Int. Cl.
*G06F 16/783* (2019.01)
*G06F 3/0484* (2022.01)
*G06F 9/451* (2018.01)
*G06F 16/738* (2019.01)

(52) U.S. Cl.
CPC ............. *G06F 9/54* (2013.01); *G06F 16/738* (2019.01); *G06F 16/7844* (2019.01)

(56) References Cited

U.S. PATENT DOCUMENTS

| | | | |
|---|---|---|---|
| 11,115,415 B2* | 9/2021 | Foresti | G06F 16/24573 |
| 2005/0268234 A1* | 12/2005 | Rossi | G06F 9/453 |
| | | | 715/705 |
| 2006/0161856 A1* | 7/2006 | Heir | G06F 9/451 |
| | | | 715/769 |
| 2006/0241945 A1* | 10/2006 | Morales | G10L 13/033 |
| | | | 704/260 |
| 2007/0198506 A1* | 8/2007 | Attaran Rezaei | G06F 16/367 |
| | | | 707/999.005 |
| 2008/0005067 A1* | 1/2008 | Dumais | G06F 16/24575 |
| 2008/0077558 A1* | 3/2008 | Lawrence | G06F 40/131 |
| 2008/0301101 A1* | 12/2008 | Baratto | G06F 9/451 |
| 2009/0150792 A1* | 6/2009 | Laakso | G06F 16/951 |
| | | | 707/999.005 |
| 2010/0229112 A1* | 9/2010 | Ergan | G06F 11/0769 |
| | | | 715/764 |
| 2010/0241647 A1* | 9/2010 | Ntoulas | G06F 16/24575 |
| | | | 707/765 |
| 2011/0246924 A1* | 10/2011 | Cohen | G06F 9/453 |
| | | | 715/772 |
| 2011/0299832 A1* | 12/2011 | Butcher | H04N 21/41407 |
| | | | 386/248 |
| 2012/0239643 A1* | 9/2012 | Ekstrand | G06F 16/3338 |
| | | | 707/E17.069 |
| 2012/0259845 A1* | 10/2012 | Matejka | G09B 7/02 |
| | | | 707/723 |
| 2012/0259868 A1* | 10/2012 | Grieves | G06F 9/453 |
| | | | 707/752 |
| 2012/0290570 A1* | 11/2012 | Ravindra | G06Q 30/02 |
| | | | 707/728 |
| 2013/0198285 A1* | 8/2013 | Ourega | G06F 16/958 |
| | | | 709/204 |
| 2013/0311508 A1* | 11/2013 | Denker | G06F 3/013 |
| | | | 707/769 |
| 2014/0038644 A1* | 2/2014 | Ngo | H04W 4/029 |
| | | | 455/456.3 |
| 2014/0358909 A1* | 12/2014 | Kolba, Jr. | G06F 16/951 |
| | | | 707/723 |
| 2015/0186153 A1* | 7/2015 | Voronkov | G06F 9/453 |
| | | | 715/708 |
| 2015/0213127 A1* | 7/2015 | Chang | G06F 16/9038 |
| | | | 707/722 |
| 2015/0220417 A1* | 8/2015 | Diment | G06F 11/3409 |
| | | | 709/224 |
| 2015/0242474 A1* | 8/2015 | Mikalsen | G06F 16/951 |
| | | | 707/722 |
| 2015/0242504 A1* | 8/2015 | Profitt | G06F 9/453 |
| | | | 707/767 |
| 2015/0339348 A1* | 11/2015 | Joo | G06F 16/433 |
| | | | 707/722 |
| 2017/0032027 A1* | 2/2017 | Mauro | G06F 16/3329 |
| 2017/0032138 A1* | 2/2017 | Navda | G06F 3/04842 |
| 2017/0083620 A1* | 3/2017 | Chew | G06F 16/48 |
| 2017/0177386 A1* | 6/2017 | Fung | G06F 3/0482 |
| 2017/0286548 A1* | 10/2017 | De | G06F 16/248 |
| 2017/0293618 A1* | 10/2017 | Gorrepati | G06F 16/316 |
| 2018/0196877 A1* | 7/2018 | Mertens | G06F 16/24575 |
| 2018/0359323 A1* | 12/2018 | Madden | H04L 67/51 |
| 2019/0034528 A1* | 1/2019 | Lintz | G06F 16/745 |
| 2019/0069013 A1* | 2/2019 | Abed | H04N 21/440236 |
| 2019/0188479 A1* | 6/2019 | Balasubramanian | |
| | | | G06K 9/00765 |
| 2019/0220537 A1* | 7/2019 | Kohlmeier | G06F 16/24578 |
| 2019/0273706 A1* | 9/2019 | Wang | G06F 40/205 |
| 2019/0347068 A1* | 11/2019 | Khaitan | G10L 15/22 |
| 2020/0026395 A1* | 1/2020 | Wantland | G06F 3/0237 |
| 2020/0110943 A1* | 4/2020 | Gunawardena | G06F 16/7328 |
| 2020/0126559 A1* | 4/2020 | Ochshorn | G11B 27/10 |
| 2020/0126583 A1* | 4/2020 | Pokharel | G06F 40/166 |
| 2020/0195983 A1* | 6/2020 | Chao | G06F 16/745 |
| 2021/0064627 A1* | 3/2021 | Kleiner | G06F 16/24578 |

OTHER PUBLICATIONS

Watch Before You Click: Smart Motion Preview, Available online at https://blogs.bing.com/search/2013/05/07/watch-before-you-click-smart-motion-preview, May 7, 2013, 2 pages.

Adar et al., CommandSpace: Modeling the Relationships between Tasks, Descriptions and Features, Proceedings of the 27th Annual ACM Symposium on User Interface Software and Technology, Available online at: https://doi.org/10.1145/2642918.2647395, Oct. 5-8, 2014, pp. 167-176.

Anik, Integrating Comments in Video Tutorials, Available online at https://mspace.lib.umanitoba.ca/handle/1993/31046, Dec. 2015, 112 pages.

Banovic et al., Waken: Reverse Engineering Usage Information and Interface Structure from Software Videos, Proceedings of the 25th Annual ACM Symposium on User Interface Software and Technology, Available online at: http://dx.doi.org/10.1145/2380116.2380129, Oct. 7-10, 2012, pp. 83-92.

Beaudouin-Lafon et al., Rethinking Interaction: From Instrumental Interaction to Human-Computer Partnerships, Extended Abstracts of the CHI Conference on Human Factors in Computing Systems, Paper No. W34, Available online at: https://doi.org/10.1145/3170427.3170635, Apr. 21-26, 2018, 5 pages.

Brandt et al., Example-Centric Programming: Integrating Web Search into the Development Environment, Proceedings of the 28th International Conference on Human Factors in Computing Systems, Available online at http://dx.doi.org/10.1145/1753326.1753402, Apr. 10-15, 2010, pp. 513-522.

Brutlag, Speed Matters for Google Web Search, Technical Report, Google, Inc., Available online at http://services.google.com/fh/files/blogs/google_delayexp.pdf, Jun. 22, 2009, 1 page.

Chan et al., Semantically Far Inspirations Considered Harmful?: Accounting for Cognitive States in Collaborative Ideation, Proceedings of the ACM SIGCHI Conference on Creativity and Cognition, Available online at: http://dx.doi.org/10.1145/3059454.3059455, Jun. 27-30, 2017, pp. 93-105.

Chang et al., Associating the Visual Representation of User Interfaces with their Internal Structures and Metadata, Proceedings of the 24th Annual ACM Symposium on User Interface Software and Technology, Available online at: https://doi.org/10.1145/2047196.2047228, Oct. 16-19, 2011, pp. 245-255.

Chi et al., MixT: Automatic Generation of Step-by-Step Mixed Media Tutorials, Proceedings of the 25th Annual ACM Symposium on User Interface Software and Technology, Available online at http://dx.doi.org/10.1145/2380116.2380130, Oct. 7-10, 2012, pp. 93-102.

Chilana et al., LemonAid: Selection-Based Crowdsourced Contextual Help for Web Applications, Proceedings of the ACM Annual Conference on Human Factors in Computing Systems, Available online at http://dx.doi.org/10.1145/2207676.2208620, May 5-10, 2012, pp. 1549-1558.

Dixon et al., Prefab Layers and Prefab Annotations: Extensible Pixel-based Interpretation of Graphical Interfaces, Proceedings of the 27th Annual ACM Symposium on User Interface Software and Technology, ACM Press, Available online at: https://doi.org/10.1145/2642918.2647412, Oct. 5-8, 2014, pp. 221-230.

Ekstrand et al., Searching for Software Learning Resources Using Application Context, Proceedings of the 24th Annual ACM Symposium on User Interface Software and Technology, Available online at https://doi.org/10.1145/2047196.2047220, Oct. 16-19, 2011, pp. 195-204.

(56) References Cited

OTHER PUBLICATIONS

Finkelstein et al., Placing Search in Context: The Concept Revisited, ACM Transactions on Information Systems, vol. 20, No. 1, Jan. 2002, pp. 116-131.

Fourney et al., InterTwine: Creating Interapplication Information Scent to Support Coordinated Use of Software, Proceedings of the 27th Annual ACM Symposium on User Interface Software and Technology, Available online at: http://dx.doi.org/10.1145/2642918.2647420, Oct. 5-8, 2014, pp. 429-438.

Fraser et al., DiscoverySpace: Suggesting Actions in Complex Software, Proceedings of the Conference on Designing Interactive Systems, Jun. 4-8, 2016, 12 pages.

Girgensohn et al., A Synergistic Approach to Efficient Interactive Video Retrieval, Human-Computer Interaction—Interact, Sep. 12-16, 2005, 14 pages.

Glassman et al., DocMatrix: Self-Teaching from Multiple Sources, Proceedings of the Association for Information Science and Technology, vol. 53, No. 1, Available online at https://doi.org/10.1002/pra2.2016.14505301064, Dec. 27, 2016, pp. 1-10.

Grossman et al., Chronicle: Capture, Exploration, and Playback of Document Workflow Histories, Proceedings of the 23nd Annual ACM Symposium on User Interface Software and Technology, Available online at: http://dx.doi.org/10.1145/1866029.1866054, Oct. 3-6, 2010, pp. 143-152.

Grossman et al., ToolClips: An Investigation of Contextual Video Assistance for Functionality Understanding, Proceedings of the 28th International Conference on Human Factors in Computing Systems, ACM Press, Available online at: http://dx.doi.org/10.1145/1753326.1753552, Apr. 10-15, 2010, pp. 1515-1524.

Hamilton et al., Streaming on Twitch: Fostering Participatory Communities of Play Within Live Mixed Media, Proceedings of the 32nd Annual ACM Conference on Human Factors in Computing Systems, Available online at: http://dx.doi.org/10.1145/2556288.2557048, Apr. 26-May 1, 2014, pp. 1315-1324.

Hartmann et al., Reflective Physical Prototyping Through Integrated Design, Test, and Analysis, Proceedings of the 19th Annual ACM Symposium on User Interface Software and Technology, Available online at: http://dx.doi.org/10.1145/1166253.1166300, Oct. 15-18, 2006, pp. 299-308.

He et al., Auto-Summarization of Audio-Video Presentations, Proceedings of the 7th ACM International Conference on Multimedia (Part 1), Available online at: http://dx.doi.org/10.1145/319463.319691, Oct. 30-Nov. 5, 1999, pp. 489-498.

Hearst, Search User Interfaces, Chapter 5, Presentation of Search Results, Cambridge University Press, Available online at: https://doi.org/10.1017/CBO9781139644082, 2009, 16 pages.

Hurst et al., Automatically Identifying Targets Users Interact with During Real World Tasks, Proceedings of the 15th International Conference on Intelligent User Interfaces, ACM Press, Available online at: https://doi.org/10.1145/1719970.1719973, Feb. 7-10, 2010, pp. 11-20.

Ichinco et al., Suggesting API Usage to Novice Programmers with the Example Guru, Proceedings of the CHI Conference on Human Factors in Computing Systems, Available online at: http://dx.doi.org/10.1145/3025453.3025827, May 6-11, 2017, pp. 1105-1117.

Kim et al., Crowdsourcing Step-by-step Information Extraction to Enhance Existing How-to Videos, Proceedings of the 32nd Annual ACM Conference on Human Factors in Computing Systems, Available online at: https://dl.acm.org/citation.cfm?doid=2556288.2556986, Apr. 26-May 1, 2014, pp. 4017-4026.

Kim et al., Data-Driven Interaction Techniques for Improving Navigation of Educational Videos, Proceedings of the 27th Annual ACM Symposium on User Interface Software and Technology, Available online at: https://doi.org/10.1145/2642918.2647389, Oct. 5-8, 2014, pp. 563-572.

Kraft et al., Y!Q: Contextual Search at the Point of Inspiration, Proceedings of the 14th ACM International Conference on Information and Knowledge Management, Available online at: https://dl.acm.org/citation.cfm?doid=1099554.1099746, Oct. 31-Nov. 5, 2005, pp. 816-823.

Kulkarni et al., Early and Repeated Exposure to Examples Improves Creative Work, Design Thinking Research, 2014, 6 pages.

Lafreniere et al., Community Enhanced Tutorials: Improving Tutorials with Multiple Demonstrations, Proceedings of the SIGCHI Conference on Human Factors in Computing Systems, Available online at: http://dx.doi.org/10.1145/2470654.2466235, Apr. 27-May 2, 2013, pp. 1779-1788.

Lafreniere et al., Investigating the Feasibility of Extracting Tool Demonstrations from in-Situ Video Content, Proceedings of the 32nd Annual ACM Conference on Human Factors in Computing Systems, Available online at: http://dx.doi.org/10.1145/2556288.2557142, Apr. 26-May 1, 2014, pp. 4007-4016.

Lafreniere et al., Task-Centric Interfaces for Feature-Rich Software, Proceedings of the 26th Australian Computer-Human Interaction Conference on Designing Futures the Future of Design, Available online at: http://dx.doi.org/10.1145/2686612.2686620, Dec. 2-5, 2014, pp. 49-58.

Lafreniere et al., Understanding the Roles and Uses of Web Tutorials, Proceedings of the 7th International AAAI Conference on Weblogs and Social Media, Association for the Advancement of Artificial Intelligence, 2013, pp. 303-310.

Li et al., Design and Evaluation of a Command Recommendation System for Software Applications, ACM Transactions on Computer-Human Interaction, vol. 18, No. 2, Available online at: http://dx.doi.org/10.1145/1970378.1970380, Jun. 2011, pp. 1-35.

Li et al., Sugilite: Creating Multimodal Smartphone Automation by Demonstration, Proceedings of the CHI Conference on Human Factors in Computing Systems, Available online at: http://dx.doi.org/10.1145/3025453.3025483, May 6-11, 2017, pp. 6038-6049.

Linder et al., Pixeltone: A Multimodal Interface for Image Editing, Extended Abstracts on Human Factors in Computing Systems, ACM Press, Available online at: http://dx.doi.org/10.1145/2468356.2479533, Apr. 27-May 2, 2013, 10 pages.

Lukowicz et al., Recognizing Workshop Activity Using Body Worn Microphones and Accelerometers, Springer, Available online at: http://dx.doi.org/10.1007/978-3-540-24646-6_2, Jan. 2004, 8 pages.

Matejka et al., Ambient Help, Proceedings of the Annual Conference on Human Factors in Computing Systems, ACM Press, Available online at: http://dx.doi.org/10.1145/1978942.1979349, May 7-12, 2011, pp. 2751-2760.

Matejka et al., CommunityCommands: Command Recommendations for Software Applications, Proceedings of the 22nd Annual ACM Symposium on User Interface Software and Technology, Available online at: http://dx.doi.org/10.1145/1622176.1622214, Oct. 4-7, 2009, pp. 193-202.

Matejka et al., IP-QAT: In-Product Questions, Answers, & Tips, Proceedings of the 24th Annual ACM Symposium on User Interface Software and Technology, Available online at: https://doi.org/10.1145/2047196.2047218, Oct. 16-19, 2011, pp. 175-184.

Matejka et al., Patina: Dynamic Heatmaps for Visualizing Application Usage, Proceedings of the SIGCHI Conference on Human Factors in Computing Systems, ACM Press, Available online at: http://dx.doi.org/10.1145/2470654.2466442, Apr. 27-May 2, 2013, pp. 3227-3236.

Nguyen et al., Making Software Tutorial Video Responsive, Proceedings of the 33rd Annual ACM Conference on Human Factors in Computing Systems, Available online at: http://dx.doi.org/10.1145/2702123.2702209, Apr. 18-23, 2015, pp. 1565-1568.

Norman, Human-Centered Design Considered Harmful, Interactions—Ambient Intelligence: Exploring Our Living Environment, vol. 12 No. 4, Available online at: https://dl.acm.org/citation.cfm?doid=1070960.1070976, Jul.-Aug. 2005, pp. 14-19.

Pan et al., TwitchViz: A Visualization Tool for Twitch Chatrooms, Proceedings of the CHI Conference Extended Abstracts on Human Factors in Computing Systems, ACM Press, Available online at: http://dx.doi.org/10.1145/2851581.2892427, May 7-12, 2016, pp. 1959-1965.

Pavel et al., Browsing and Analyzing the Command-Level Structure of Large Collections of Image Manipulation Tutorials, Technical Report No. UCB/EECS-2013-167, Electrical Engineering and Computer Sciences, University of California, Available online at: http://www.eecs.berkeley.edu/Pubs/TechRpts/2013/EECS-2013-167.html, Oct. 9, 2013, 12 pages.

(56) References Cited

OTHER PUBLICATIONS

Pavel et al., SceneSkim: Searching and Browsing Movies Using Synchronized Captions, Scripts and Plot Summaries, Proceedings of the 28th Annual ACM Symposium on User Interface Software & Technology, Available online at: ttps://doi.org/10.1145/2807442.2807502, Nov. 11-15, 2015, pp. 181-190.
Pavel et al., Video Digests: A Browsable, Skimmable Format for Informational Lecture Videos, Proceedings of the 27th Annual ACM Symposium on User Interface Software and Technology, Available online at: http://dx.doi.org/10.1145/2642918.2647400, Oct. 5-8, 2014, pp. 573-582.
Pirolli, Information Foraging Theory: Adaptive Interaction with Information, Oxford University Press, 2009, 2 pages.
Pongnumkul et al., Pause-and-Play: Automatically Linking Screencast Video Tutorials with Applications, Proceedings of the 24th Annual ACM Symposium on User Interface Software and Technology, Available online at: http://dx.doi.org/10.1145/2047196.2047213, Oct. 16-19, 2011, pp. 135-144.
Riemana Field Study of Exploratory Learning Strategies, ACM Transactions on Computer-Human Interaction, vol. 3, No. 3, Available online at: https://doi.org/10.1145/234526.234527, Sep. 1996, pp. 189-218.
Rose et al., Teaching Every Student in the Digital Age: Universal Design for Learning, Association for Supervision and Curriculum Development, 2002, 6 pages.
Russell et al., Making the Most of Online Searches, APS Observer, vol. 24, No. 4, Available online at: https://www.psychologicalscience.org/observer/making-the-most-of-online-searches, Apr. 2011, accessed Nov. 4, 2019. 5 pages.
Schoen, The Reflective Practitioner: How Professionals Think in Action, Basic Books, Available online at: https://books.google.com/books/about/The Reflective Practitioner.html?id=ceJIWay4-jgC, Sep. 23, 1984, 8 pages.
Schon, The Design Studio: An Exploration of its Traditions and Potential (Architecture and the Higher Learning), RIBA Publications, Intl. Specialized Book Services, Available online at: https://www.abebooks.com/9780947877453/Design-Studio-Exploration-Traditions-Potentials-0947877452/plp, 1986, 5 pages.
Schoop et al., Drill Sergeant: Supporting Physical Construction Projects Through an Ecosystem of Augmented Tools, Proceedings of the CHI Conference Extended Abstracts on Human Factors in Computing Systems, Available online at: http://dx.doi.org/10.1145/2851581.2892429, May 7-12, 2016, pp. 1607-1614.
Siangliulue et al., Providing Timely Examples Improves the Quantity and Quality of Generated Ideas, Proceedings of the ACM SIGCHI Conference on Creativity and Cognition, Available online at: http://dx.doi.org/10.1145/2757226.2757230, Jun. 22-25, 2015, pp. 83-92.
Simon, Theories of Bounded Rationality, Decision and Organization, North-Holland Publishing Company, Chapter 8, Available online at: http://innovbfa.viabloga.com/files/Herbert_Simon_theories_of_bounded_rationality_1972.pdf, 1972, pp. 161-176.
Sjoblom et al., Why Do People Watch Others Play Video Games? An Empirical Study on the Motivations of Twitch Users, Computers in Human Behavior, vol. 75, No. C, Available online at: http://dx.doi.org/10.1016/J.CHB.2016.10.019, Oct. 2017, 12 pages.
Stuerzlinger et al., User Interface Facades: Towards Fully Adaptable User Interfaces, Proceedings of the 19th Annual ACM Symposium on User Interface Software and Technology, Available online at: https://dl.acm.org/citation.cfm?doid=1166253.1166301, Oct. 15-18, 2006, pp. 309-318.
Sullivan, A Reintroduction to Google's Featured Snippets, Available online at: https://www.blog.google/products/search/reintroduction-googles-featured-snippets/, Jan. 30, 2018, 12 pages.
Sumner et al., Evolution, not Revolution: Participatory Design in the Toolbelt Era, Computers and Design in Context, Chapter 1, MIT Press, Available online at: https://dl.acm.org/citation.cfm?id=270319, 1997, 10 pages.
Torrey et al., How-to Pages: Informal Systems of Expertise Sharing, Proceedings of the Tenth European Conference on Computer-Supported Cooperative Work, Available online at: http://dx.doi.org/10.1007/978-1-84800-031-5_21, Sep. 24-28, 2007, pp. 391-410.
Truong et al., Video Abstraction: A Systematic Review and Classification, Transactions on Multimedia Computing, Communications, and Applications, (TOMM), vol. 3, No. 1, Article No. 3, Available online at: http://dx.doi.org/10.1145/1198302.1198305, Feb. 2007, 37 pages.
Tuovinen et al., A Comparison of Cognitive Load Associated with Discovery Learning and Worked Examples, Journal of Educational Psychology, vol. 91, No. 2, Available online at: http://idtoolbox.eseryel.eom/uploads/9/0/7/5/9075695/1999-03660-014.pdf, 1999, pp. 334-341.
Vermette et al., Social CheatSheet: An Interactive Community-Curated Information Overlay for Web Applications, Proceedings of the ACM on Human-Computer Interaction, vol. 1, Issue CSCW, Article 102, Available online at: https://doi.org/10.1145/3134737, Nov. 2017, pp. 1-19.
Wang et al., Leveraging Community-Generated Videos and Command Logs to Classify and Recommend Software Workflows, Proceedings of the CHI Conference on Human Factors in Computing Systems, Paper No. 285, Available online at: https://dl.acm.org/citation.cfm?doid=3173574.3173859, Apr. 21-26, 2018, 13 pages.
Xiao et al., An Empirical Study of the Effect of Agent Competence on User Performance and Perception, Proceedings of the Third International Joint Conference on Autonomous Agents and Multiagent Systems, vol. 1, Available online at: https://dl.acm.org/citation.cfm?id=1018745, Jul. 19-23, 2004, pp. 178-185.
Zhong et al., JustSpeak: Enabling Universal Voice Control on Android, Proceedings of the 11th Web for All Conference, Article No. 36, Available online at: https://dl.acm.org/citation.cfm?doid=2596695.2596720, Apr. 7-9, 2014, 4 pages.

\* cited by examiner

FACILITATING CONTEXTUAL VIDEO SEARCHING USING USER INTERACTIONS WITH INTERACTIVE COMPUTING ENVIRONMENTS

TECHNICAL FIELD

This disclosure relates generally to facilitating a contextual video search in an interactive computing environment based on interactions with the interactive computing environments. More specifically, but not by way of limitation, this disclosure relates to controlling video search queries by tracking user actions in the interactive computing environment and using the tracked user actions to identify videos or video segments relevant to the user actions.

BACKGROUND

Interactive computing environments, such as web-based applications or other online software platforms, allow users to perform various computer-implemented functions through graphical interfaces. For instance, an interactive computing environment can provide a user with one or more content creation tools that provide a user with the ability to create artistic content or any other content (e.g., programming using programming tools) within the interactive computing environment. In an example, a user accesses video instruction guides for a desired skill associated with the content creation tools of the interactive computing environment to learn how to successfully create the content using the content creation tools.

The video instruction guides provide a user with examples of how to achieve a desired result using the tools of the interactive computing environment. However, the video instruction guides, such as live-streams of artists working with a tool of the interactive computing environment or other instructional videos, are often very lengthy. Because of the length and the relatively unstructured nature of the video instruction guides, a user may find it difficult to find portions of a video relevant to a specific task. For example, a user may not be able to find a portion of the video instruction guide that details how to perform a specific task within the context of a two or three hour video because the video includes a video navigation interface, such as a timeline, that is not designed for navigating step-by-step instructions.

Identifying content within a video can help to determine the portions of the video relevant to a user's task. However, identifying the content is often difficult when relying on summaries of the videos that may only reference an individual aspect of the video. Existing methods are insufficient to reliably identify relevant video segments due to a lack of context in video searching.

SUMMARY

Certain embodiments involve contextual video searching in an interactive computing environment based on user interactions with the interactive computing environments. For example, a method includes detecting control of an active content creation tool of an interactive computing system in response to a user input received at a user interface of the interactive computing system. The method also includes automatically updating a video search query based on the detected control of the active content creation tool to include context information about the active content creation tool. Further, the method includes performing a video search of video captions from a video database using the video search query and providing search results of the video search to the user interface of the interactive computing system.

In another example, a method includes detecting control of an active content creation tool of an interactive computing system in response to a user input received at a user interface of the interactive computing system. The method also includes automatically updating a video search query based on the detected control of the active content creation tool to include context information about the active content creation tool and context information about at least one recently active content creation tool. Further, the method includes performing a video search of video captions from a video database using the video search query and providing ranked search results of the video search to the user interface of the interactive computing system.

In another example, a method includes detecting control of an active content creation tool of an interactive computing system in response to a user input received at a user interface of the interactive computing system. The method also includes automatically updating a video search query based on the detected control of the active content creation tool to include context information about the active content creation tool. Further, the method includes performing a video search of video captions from a video database using the video search query. Furthermore, the method includes ranking search results of the video search to generate a set of ranked search results of the video search and providing the ranked search results to the user interface of the interactive computing system.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
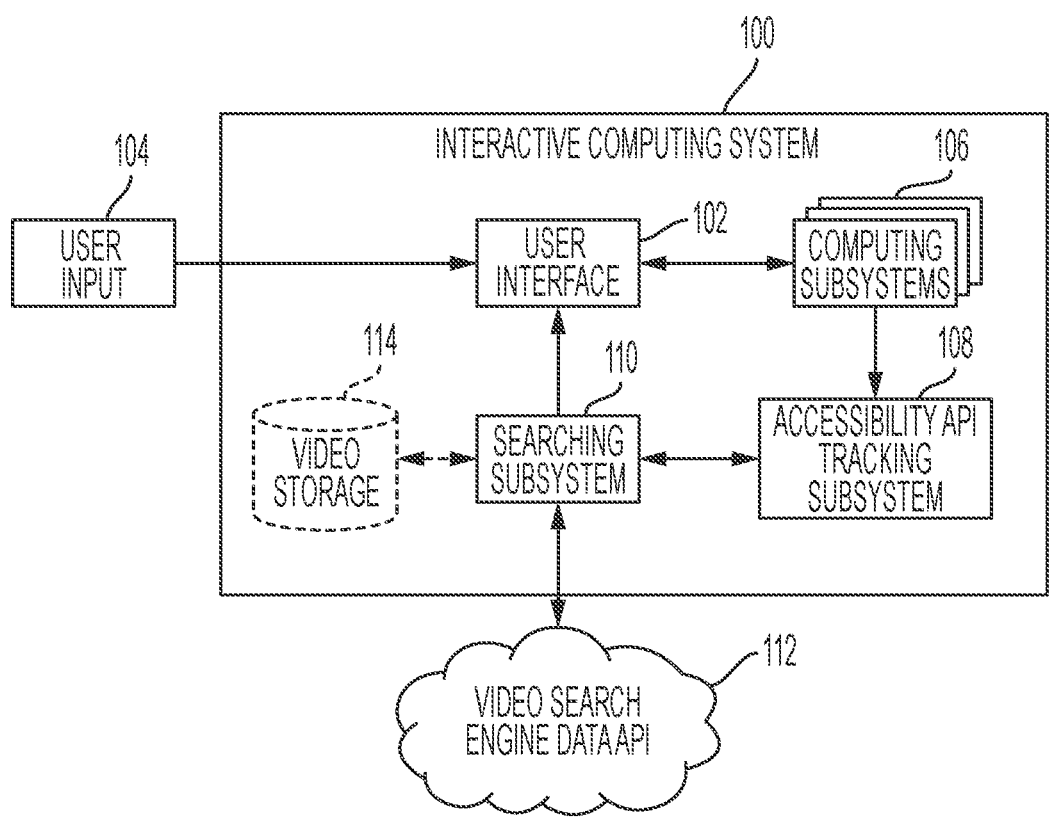
FIG. 1 depicts an example of an interactive computing system in which a user interface is used to receive a user input.

Certain embodiments involve automatically controlling video search queries by tracking user actions on content creation tools in an interactive computing environment and appending or otherwise adding information associated with the tracked user actions to the video search queries. By controlling the video search queries in this manner, the tracked user actions may be used to identify videos or video segments relevant to the user interactions with the content creation tools. In some instances, certain embodiments involve performing video searches using the video search queries and subsequently identifying relevant portions of video search results by searching caption tracks of the videos (i.e., closed captioning generated for videos) for similarities to search terms of the video search queries.

For instance, the interactive computing environment may access a video search engine application programming interface (API) and identify videos that are relevant to the video search queries. In an example, a searching subsystem further identifies relevant portions of the video search results to the video search query by comparing the caption tracks of the video search results to the search terms provided by the video search query. In one or more examples, the relevant portions of the video search results are ranked and presented to a user based on a number of matches identified between terms of the video search query (e.g., including context information of an active tool) and text in the caption tracks.

The following non-limiting example is provided to introduce certain embodiments. In this example, an interactive computing system provides a user with a user interface that is capable of receiving user input to manipulate one or more computing subsystems of the interactive computing system. In the example, control of an active content creation tool (e.g., an interactive element of a computing subsystem) may be detected in response to a user input that is received at the user interface of the interactive computing system. The content creation tools may provide a user with the ability to generate an output from the tool within the interactive computing system. For example, the output from the tool can be an original work of art that is generated using the functions of the content creation tools of the computing subsystems.

Continuing with this example, the interactive computing system may leverage operating system accessibility features to detect mouse clicks and keystrokes used to control the active content creation tool. The interactive computing system may identify the active content creation tool in which the mouse clicks or keystrokes occur, the type of element that was interacted with within the active content creation tool, and an accessibility title and description of the element, when present.

In response to detecting the control of the active content creation tool by the user within the user interface, a searching subsystem of the interactive computing system may automatically updates a video search query based on the detected control of the active content creation tool. In an example, updating the video search query involves adding context information about the active content creation tool to the video search query. For example, the context information may include an indication of the active content creation tool, an indication of an interactive element of the active content creation tool interacted with which the user interacted, clarifying terms associated with the active content creation tool (e.g., the creator or supplier of the active content creation tool and an activity domain in which the active content creation tool operates), any other context information based on the detected control of the active content creation tool, or any combination thereof. By automatically updating the video search query based on detected user interactions, context information may be used to enhance results of the search.

For example, a searching subsystem of the interactive computing system may perform a video search of video captions from a video database using the search query. In an example, the searching subsystem leverages a video search engine data application programming interface (API) to generate the search results. In an additional example, the searching subsystem performs the video search on videos stored locally at the interactive computing system. In such an example, the active content creation tool may be associated with a library of videos stored at the interactive computing system or a remote memory device that are searchable based on tasks that the active content creation tool is capable of performing.

Upon completion of the video search, the searching subsystem provides search results of the video search to the user interface of the interactive computing system. In an example, the search results are ranked based on relevance of video segments in the search results to the search query. For example, the search results may be segmented into clips (e.g., 30 seconds in length), and the clips from all of the search results may be ranked based on the relevancy of the caption tracks of the clips to the search terms provided by the video search query. In an example, each video provided to the user interface of the interactive computing system begins playback at a start of a clip with a highest ranking of the video. A user may use the ranked search results to review portions of videos that are relevant to interactions of the user with an active content creation tool. These portions of videos that are relevant to the interactions of the user with an active content creation tool are able to provide a user with inspiration or guidance for further content creation.

As described herein, certain embodiments provide improvements to video searching by solving problems that are specific to interactive computing environments. These improvements include more effectively contextualizing video searches through automatic video search query updates and enhancing relevance of search results through segmentation and clip ranking of the search results. Effectively and accurately performing a video search is uniquely difficult because the length and the relatively unstructured nature of the videos presents a significant challenge to finding relevant portions of a video for a specific task.

Because these video searching problems are specific to computing environments, embodiments described herein utilize techniques that are uniquely suited for performance in computing environments. For instance, the interactive computing system may automatically record mouse clicks, keystrokes, or other interaction data within active content creation tools running on the interactive computing system. Using the recorded interactions with the active content creation tools, the interactive computing system may automatically update a context component of search queries provided to a video searching environment. This updated context component is usable for enhancing the video searching environment by, for example, performing searches that are automatically directed toward videos that include interactions with the active content creation tools being used by a user of the interactive computing system. Accurate and precise video searches can enhance usability of the active content creation tools within the interactive computing system, as compared to existing systems.

As used herein, the term "interactive computing system" refers to a computing environment in which a user is able to interact with computing subsystems to produce an output (e.g., a work of art, a document, music, etc.). In this disclosure, the interactive computing system may be capable of detecting mouse clicks, keystrokes, or other interactions by a user at a user interface within one or more computing subsystems. For example, clicking or otherwise interacting with one or more elements within the computing subsystems may be tracked to update a context of a video search query.

As used herein, the term "computing subsystem" refers to one or more computing tools of the interactive computing system. Examples of computing tools include software applications running on the interactive computing system. The software applications may be used by a user to produce the output from the interactive computing system.

As used herein, the term "searching subsystem" refers to a system that updates video search queries based on context of a user's interactions. In some examples, the searching subsystem either provides the video search queries to a video search engine data application programming interface (API) (e.g., an online video search engine), or the searching system performs searches within a local or remote video storage using the video search queries.

As used herein, the term "video search query" refers to a query used as a basis of a video search. The video search query may be automatically generated based on user interaction with the computing subsystems of the interactive computing environment, or the video search query may be appended with context information based on the user interaction with the computing subsystems. Further, the video search query may be editable such that a user is able to add to the query, modify the query, or replace the query entirely.

Referring now to the drawings, FIG. 1 is an example of an interactive computing system 100 in which a user interface 102 is used to receive a user input 104. The user input 104 is received from any interaction of the user with an input/output (I/O) device of the interactive computing system 100. Examples of the I/O device may include a mouse, a keyboard, a touchscreen, or any other I/O device capable of providing input to interact with the user interface 102.

In various examples, the interactive computing system 100 includes the one or more computing subsystems 106 that are deployable within the interactive computing system 100. In an example, the computing subsystems 106 include computer programs that are performed by one or more processors of the interactive computing system 100 to perform various functions within the interactive computing system 100. For example, the computing subsystems 106 can include image editing tools, music tools, word processing tools, or any other tools that are presentable at the user interface 102 for interaction with the user input 104.

In an example, the computing subsystems 106 include accessibility application programming interfaces (APIs). The accessibility APIs are generally used to provide alternative presentation and interaction methods for users of the computing subsystems 106. For example, the accessibility APIs can provide low-level access to software input, processes, and output to assistive technology (e.g., a screen reader). Accordingly, interactive elements in computing subsystems 106 include accessibility information that is accessible by the assistive technology. An accessibility API tracking subsystem 108 included in the interactive computing system 100 may track the accessibility information provided by the accessibility APIs for interactive elements.

For example, the accessibility API tracking subsystem 108 may detect the user input 104 acting on interactive elements of the computing subsystems 106 at the user interface 102 based on the accessibility information of the interactive elements. In such an example, the accessibility API tracking subsystem 108 tracks mouse clicks, keystrokes, or other user inputs 104 acting on the interactive elements of the computing subsystems 106 displayed on the user interface 102. The accessibility API tracking subsystem 108 may detect and record a type of user input 104 (e.g., mouse click, keystroke, etc.), details of the interactive element (e.g., accessibility title, description, etc.), and details of the computing subsystem 106 generating the interactive element (e.g., application provider, domain in which the tool operates, etc.).

Because the accessibility API tracking subsystem 108 may track the user input 104 within the user interface 102, the accessibility API tracking subsystem 108 may update or otherwise modify video search queries provided to a searching subsystem 110. For example, the search query provided to the searching subsystem 110 may be generated by concatenating the name of the active computing subsystem 106 (e.g., an active content creation tool with which the user interacts), names of the last several computing subsystems 106 with which a user interacted, clarifying terms (e.g., a provider and domain of the active computing subsystem 106), or any combination thereof. The concatenated terms added to the video search queries minimize opportunities for irrelevant videos to be returned as search results. That is, the concatenated terms provide context to the video search queries. In an example where the user input 104 is provided to a computing subsystem 106 that includes the term "sketch" in the name, the video search query includes a contextual element that the video search query should produce results related to the specific computing subsystem 106 that includes the term "sketch" rather than general sketching videos.

The video search query is provided from the searching subsystem 110 to a video search engine data API 112. In an example, the video search engine data API 112 performs a search based on the automatically generated video search query including the concatenated terms or the concatenated terms combined with additional search terms provided by the user as user input 104. The video search engine data API 112 searches a corpus of videos with a caption track for the terms included in the video search query. The video search engine data API 112 returns videos to the searching subsystem 110 that are determined to be most relevant to the video search query.

In some examples, the searching subsystem 110 searches a video storage subsystem 114 using the video search query. In an example, the video storage subsystem 114 includes a number of videos stored locally at the interactive computing system 100. The video storage subsystem 114 can also be a remote storage device that is accessible by the interactive computing system 100. In either example, the searching subsystem 110 searches the video storage subsystem 114 for videos that are relevant to the video search query.

Upon receipt of the videos most relevant to the video search query, the searching subsystem 110 may further processes the videos to find clips within the videos that are the most relevant to the video search query. For example, the searching subsystem 110 segments the video results from the video search engine data API 112 or the video storage subsystem 114. In an example, clip segments of the video are a standard length (e.g., 30 seconds). For each segment of each video of the search results, the searching subsystem 110 may review caption text from a caption track of the video and compare the caption text to words from the video search query and to a set of key phrases. Examples from the set of key phrases may include "for example," "show you," "very good," "very cool," "really cool," "I did," "powerful,"

"interesting," "nice feature," "handy," "magic," "good question," or any other words or phrases that would generally indicate importance to an activity occurring in the video. By ranking each segment based on a total number of matches to the words from the video search query (e.g., including contextual information) and the set of keywords, the searching subsystem 110 may provide the search results to the user interface 102 with each video cued to segments with the highest ranking.

In displaying the search results at the user interface 102, the searching subsystem 110 may provide a user with relevant search results produced from a video search query that is automatically contextualized by user interactions with the computing subsystems 106 within the user interface 102. Further, the search results may be cued to relevant segments of the videos to the video search query. When viewing long videos, such as live-stream videos, cuing the videos to relevant segments prevents the user of the interactive computing system 100 from performing fruitless browsing through irrelevant portions of the long videos.

Figure 2:
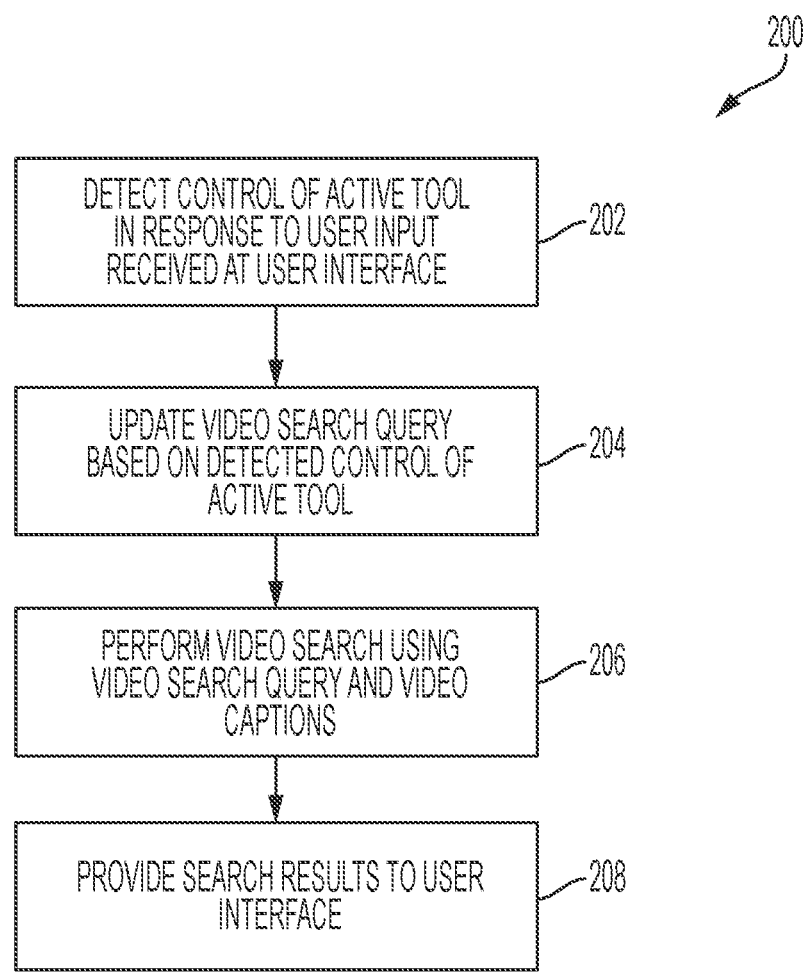
FIG. 2 depicts an example of a process for generating search results based on a video search query.

FIG. 2 depicts an example of a process 200 for generating search results based on the video search query. One or more computing devices (e.g., the interactive computing system 100) implement operations depicted in FIG. 2 by executing suitable program code (e.g., the computing subsystems 106, the accessibility API tracking subsystem 108, and the searching subsystem 110). For illustrative purposes, the process 200 is described with reference to certain examples depicted in the figures. Other implementations, however, are possible.

At block 202, the process 200 involves detecting control of an active content creation tool (e.g., of one of the computing subsystems 106) in response to user input 104 received at the user interface 102 of the interactive computing system 100. For instance, a user may provide the user input 104 to the user interface 102 when interacting with content creation tools provided in the computing subsystems 106. In an example, the user input 104 may include mouse clicks, keyboard strokes, stylus input, touchscreen interactions, or any other input provided by the user to the user interface 102. In one or more examples, the user input 104 is provided to the user interface 102 while the user is creating an artistic expression in one or more computing subsystems 106 using one or more content creation tools provided within the computing subsystems 106. The active content creation tools (e.g., a paint brush, a text feature, etc.) of the computing subsystem 106 may be controlled in response to the user input 104 within the user interface 102. For example, the active content creation tool is controlled by the user to generate an artistic expression in the one or more computing subsystems 106. In another example, the active content creation tool is controlled by the user to perform any other functions within the interactive computing subsystem 100.

In an example, the interactive computing system 100 may detect the user input 104 acting on interactive elements of the active content creation tool at the user interface 102 using the accessibility API tracking subsystem 108 based on the accessibility information of the interactive elements. As discussed above with respect to FIG. 1, the accessibility API tracking subsystem 108 may track mouse clicks, keystrokes, or other user inputs 104 acting on the active content creation tool displayed on the user interface 102. The accessibility API tracking subsystem 108 may detect and record a type of user input 104 (e.g., mouse click, keystroke, etc.), details of the active content creation tool (e.g., accessibility title, description of the active content tool, etc.), and details of the computing subsystem 106 generating the active content creation tool (e.g., application provider, domain of the tool, etc.).

At block 204, the process 200 involves updating a video search query based on detected control of the active content creation tool. Because the accessibility API tracking subsystem 108 may track the user input 104 within the user interface 102, the accessibility API tracking subsystem 108 may update or otherwise modify the video search query provided to a searching subsystem 110. For example, the video search query provided to the searching subsystem 110 may be generated by concatenating the name of the active computing subsystem 106, a name of the active content creation tool from the computing subsystem 106 with which the user interacted, the last several computing subsystems 106 with which a user interacted, clarifying terms (e.g., a provider and domain of the active computing subsystem 106), or any combination thereof. The concatenated terms added to the video search queries prevent irrelevant videos from being returned as search results. That is, the concatenated terms provide context to the video search queries.

At block 206, the process 200 involves performing a video search using the video search query and video captions associated with a corpus of searchable videos. For example, the video search query is provided from the searching subsystem 110 to the video search engine data API 112. The video search engine data API 112 may search a corpus of videos with a caption track for the terms included in the video search query. The video search engine data API 112 may return videos to the searching subsystem 110 that are determined to be most relevant to the video search query. Upon receipt of the most relevant videos to the video search query, the searching subsystem 110 may further process the videos to find clips within the videos that are the most relevant to the video search query, as discussed below with respect to FIG. 4.

In an additional example, the searching subsystem 110 searches a video storage subsystem 114 using the video search query. In such an example, the video storage subsystem 114 may include a number of videos stored locally at the interactive computing system 100. The video storage subsystem 114 can also be a remote storage device that is accessible by the interactive computing system 100. In either example, the searching subsystem 110 searches the video storage subsystem 114 for videos that are relevant to the video search query. Upon receipt of the most relevant videos to the video search query, the searching subsystem 110 further processes the videos to find clips within the videos that are the most relevant to the video search query.

At block 208, the process 200 involves providing the search results to the user interface 102. The search results may be provided to the user interface 102 as an ambient side panel within the computing subsystems 106 displayed on the user interface 102, as an on-demand window accessible within the user interface 102, or as a contextual tool tip in the user interface 102 that is accessible when the user hovers over an interactive content creation tool tip element. The presentation of the search results at the user interface 102 provides the user with the ability to access video segments that are relevant to the current task that the user is attempting.

Figure 3:
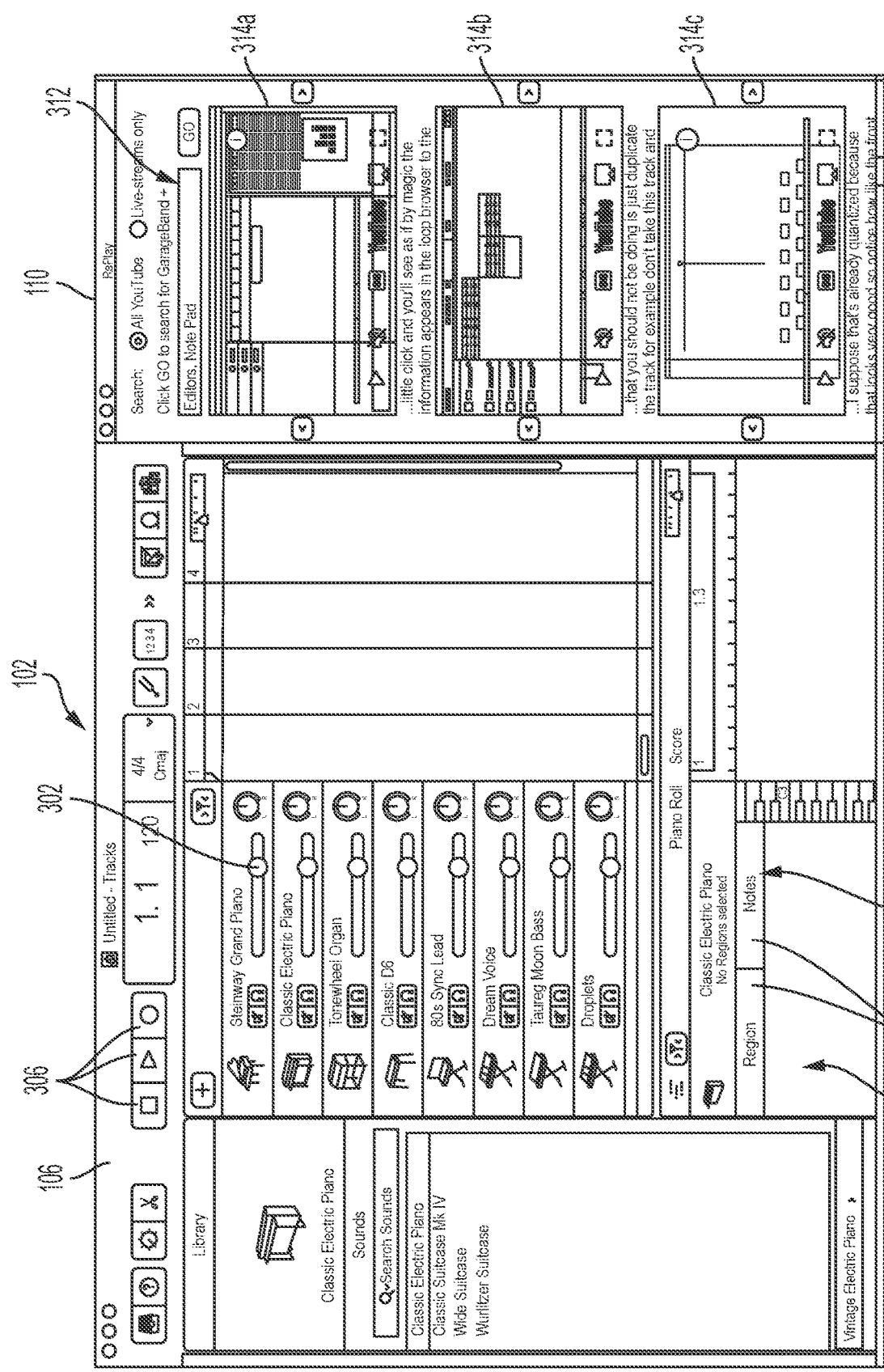
FIG. 3 depicts an example of the user interface of FIG. 1 operating a computing subsystem.

FIG. 3 depicts an example of the user interface 102 operating a computing subsystem 106. As illustrated, the computing subsystem 106 is a music editing tool operated within the interactive computing system 100. A user of the interactive computing system 100 may interact with interactive elements of the computing subsystem 106 using one or more I/O devices (e.g., mouse clicks, keyboard strokes, touch screen input, etc.). The interactive elements within the user interface 102 include slider buttons 302, interactive tabs 304, playback control buttons 306, or any other elements that are provided by the computing subsystem 106 and interactive within the user interface 102.

When the user interacts with an interactive element in the user interface 102, the accessibility API tracking subsystem 108 may tracks a context of the interaction. For example, the accessibility API tracking subsystem 108 tracks that the user has selected an editor window 308 within the computing subsystem 106, and the accessibility API tracking subsystem 108 further tracks that a note pad 310 within the editor window 308 is selected. This information, along with the context of the computing subsystem 106 (e.g., an application provider of the computing subsystem 106, the operational domain of the computing subsystem 106, etc.), may be provided as a video search query 312 to the searching subsystem 110. The video search query 312, which is generated automatically based on the user input 104 in the user interface 102, can also include supplemental information provided by the user.

As illustrated, the searching subsystem 110 is presented within the user interface 102 as an ambient side panel. In other examples, the searching subsystem 110 is presented as a component directly within the computing subsystems 106, as an on-demand window accessible within the user interface 102 (e.g., a collapsible window), or as a contextual tool tip in the user interface 102 that is accessible when the user hovers over an interactive content creation tool tip element.

The searching subsystem 110 may present three videos 314a, 314b, and 314c determined to have the most relevance to the video search query. For example, the video search engine data API 112 may be employed to determine the most relevant videos 314 to the video search query 312 from a corpus of videos with a caption track. In other examples, the searching subsystem 110 can determine the most relevant videos 314 to the video search query 312 from the video storage subsystem 114, which includes a corpus of videos stored locally within the interactive computing system 100 or at a remote location accessible by the interactive computing system 100.

Each of the three videos 314a, 314b, and 314c are cued to segments that are ranked by the searching subsystem 110 as the most relevant to the video search query 312. For example, the searching subsystem 110 segments the videos into segments of a specified length (e.g., 30 seconds), and the searching subsystem 110 ranks the segments based on a number of matches between the caption track of the segments and the words of the video search query 312 and additional keywords. Ranking the segments identifies the segments of the videos 314a, 314b, and 314c that are the most relevant to the video search query 312. As displayed in the search results of the searching subsystem 110, the videos 314a, 314b, and 314c are each cued to segments of the videos that are indicated as the most relevant to the video search query 312. In this manner, the user can avoid browsing through a lengthy video to find content that is relevant to the interactions of the user at the user interface 102.

Figure 4:
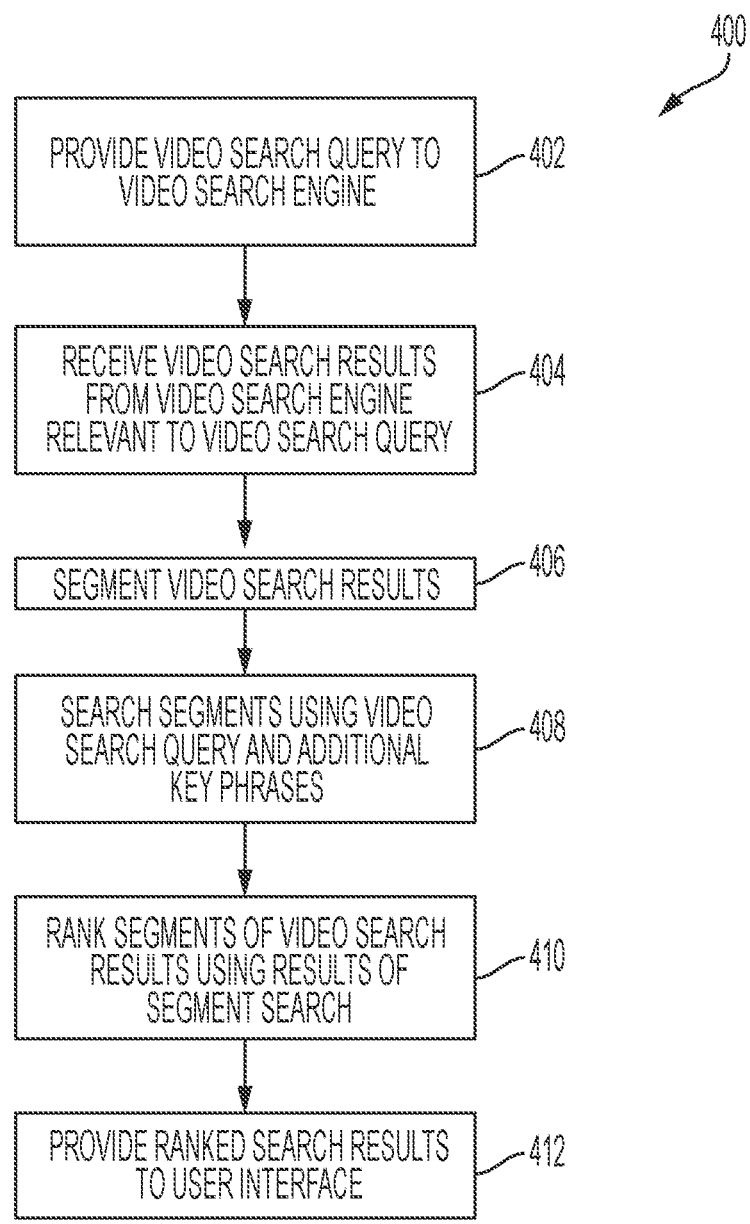
FIG. 4 depicts an example of a process for ranking segments of video search results using a video search query.

FIG. 4 depicts an example of a process 400 for ranking segments of video search results using the video search query 312. One or more computing devices (e.g., the interactive computing system 100) implement operations depicted in FIG. 4 by executing suitable program code. For illustrative purposes, the process 400 is described with reference to certain examples depicted in the figures. Other implementations, however, are possible.

At block 402, the process 400 involves providing the video search query 312 to a video search engine. In an example, the video search engine is the video search engine data API 112 that is remotely accessible by the interactive computing system 100. In another example, the video search engine is part of the searching subsystem 110 of the interactive computing system 100, and the video search engine searches a corpus of videos stored locally or remotely in the video storage subsystem 114.

At block 404, the process 400 involves receiving video search results from the video search engine that are relevant to the video search query 312. For instance, the video search engine identifies a list of videos that include a caption track and are perceived to be the most relevant to the video search query 312. In an example, the searching subsystem 110 may use the videos identified by the search engine as the most relevant. For example, in FIG. 3, the searching subsystem 110 used the three most relevant videos 314a, 314b, and 314c identified by a video search engine. More or fewer relevant videos 314 may also be used by the searching subsystem 110.

At block 406, the process 400 involves segmenting the video search results. For example, each of the videos identified in the video search results may be segmented into segments of a predetermined length of time. In one or more examples, the segments are 30 seconds long. However, longer or shorter segment lengths are also contemplated.

At block 408, the process 400 involves searching the segments using the video search query 312 and additional key phrases. For example, the segments can be searched to identify matches between the caption tracks of the video search results and words from the video search query 312 in combination with key phrases from a domain dictionary. The key phrases in the domain dictionary are changeable over time as cultural norms change. Examples of the key phrases in the domain dictionary include "for example," "show you," "very good," "very cool," "really cool," "I did," "powerful," "interesting," "nice feature," "handy," "magic," "good question," or any other words or phrases that would generally indicate importance to an activity occurring in the video. Further, the domain dictionary could have different key phrases for different domains. For example, when searching videos associated with a physical task (e.g., making a ceramic vase), there may be different key terms included in the domain dictionary than for videos associated with a software content creation task.

At block 410, the process 400 involves ranking the segments of the video search results using the results of the segment search from block 408. For example, segments from each video of the video search results may be ranked based on a number of matches of keywords and key phrases within the caption track of the videos, as identified at block 408. Further, the video search query 312 can include context information indicating an active content creation tool and recently used content creation tools. Certain segments that mention both the active content creation tool and the recently used content creation tools are ranked above other segments that include fewer mentions of the content creation tools (e.g., only the active content creation tool or only one of the recently used content creation tools). These rankings provide an indication of which segments are the most relevant to the video search query 312.

At block 412, the process 400 involves providing the ranked search results to the user interface 102. The ranked search results provided to the user interface 102 can be the top several videos retrieved from the search engine and cued to the top ranked segments identified at block 410. In this manner, the user is able to efficiently find content from the video search results that is relevant to the task on which the user is working.

Figure 5:
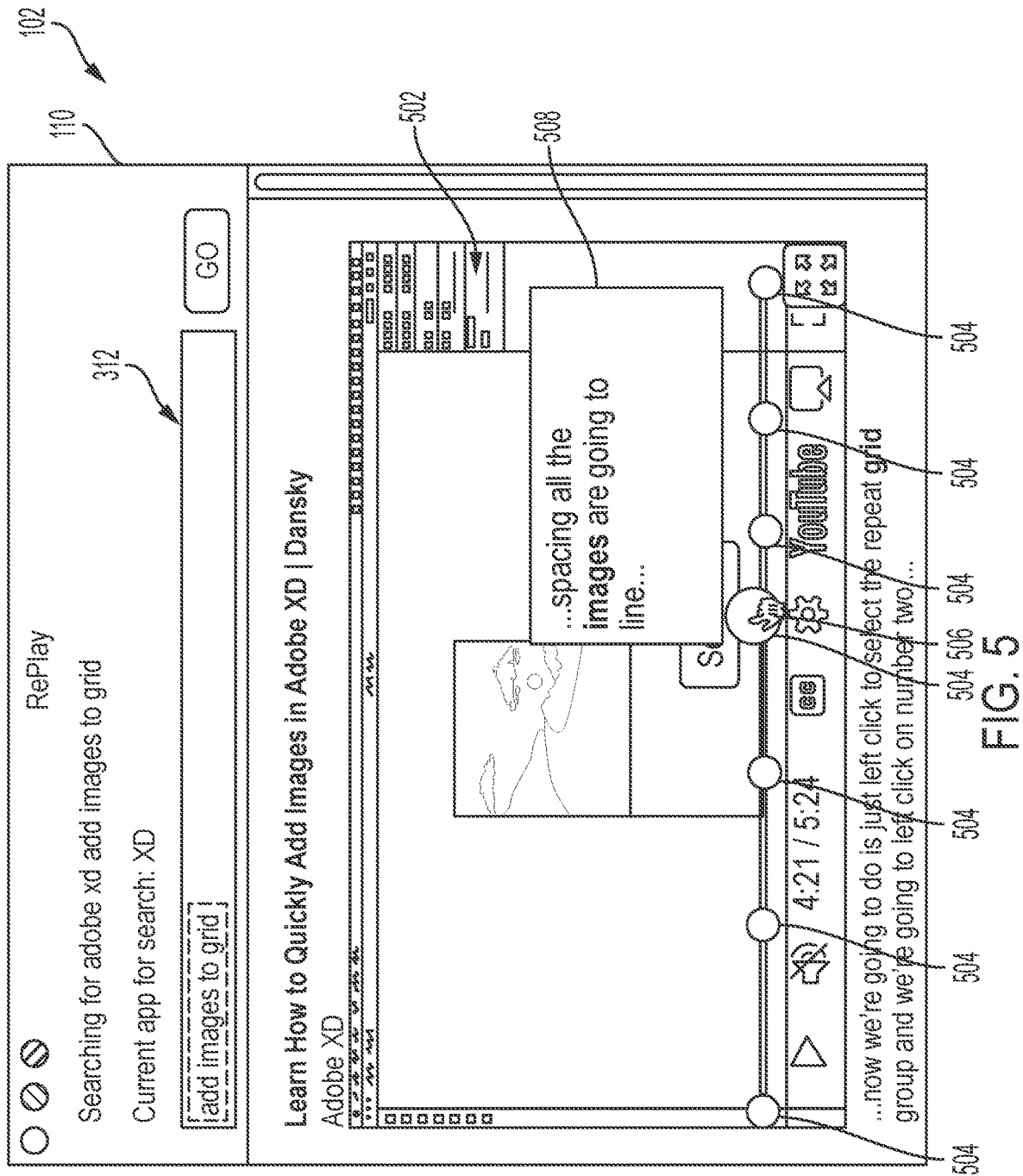
FIG. 5 depicts an example of a searching subsystem of the interactive computing system of FIG. 1 displayed on a portion of the user interface of FIG. 1.

FIG. 5 depicts an example of the searching subsystem 110 displayed on a portion of the user interface 102. A top video search result 502 based on the video search query 312 is depicted. The top video search result 502 includes marker overlays 504 to indicate segments of the video where the caption track of the video matches the video search query 312. In an example, the marker overlays 504 may be color coded to identify segments that more closely match the video search query 312 than other segments. For example, a green marker overlay 504 represents a close match, a yellow marker overlay 504 represents a weak match, and a red marker overlay 504 represents no match. In another example, one color marker overlay 504 may represent a query match while another color marker overlay 504 may represent a context match.

Moving a cursor 506 over a marker overlay 504 generates a pop-up window 508. The pop-up window 508 provides an excerpt from the caption track of a video segment associated with the marker overlay 504. Additionally, clicking or otherwise selecting the marker overlay 504 begins playback of the video search result 502 at the moment associated with the marker overlay 504.

Figure 6:
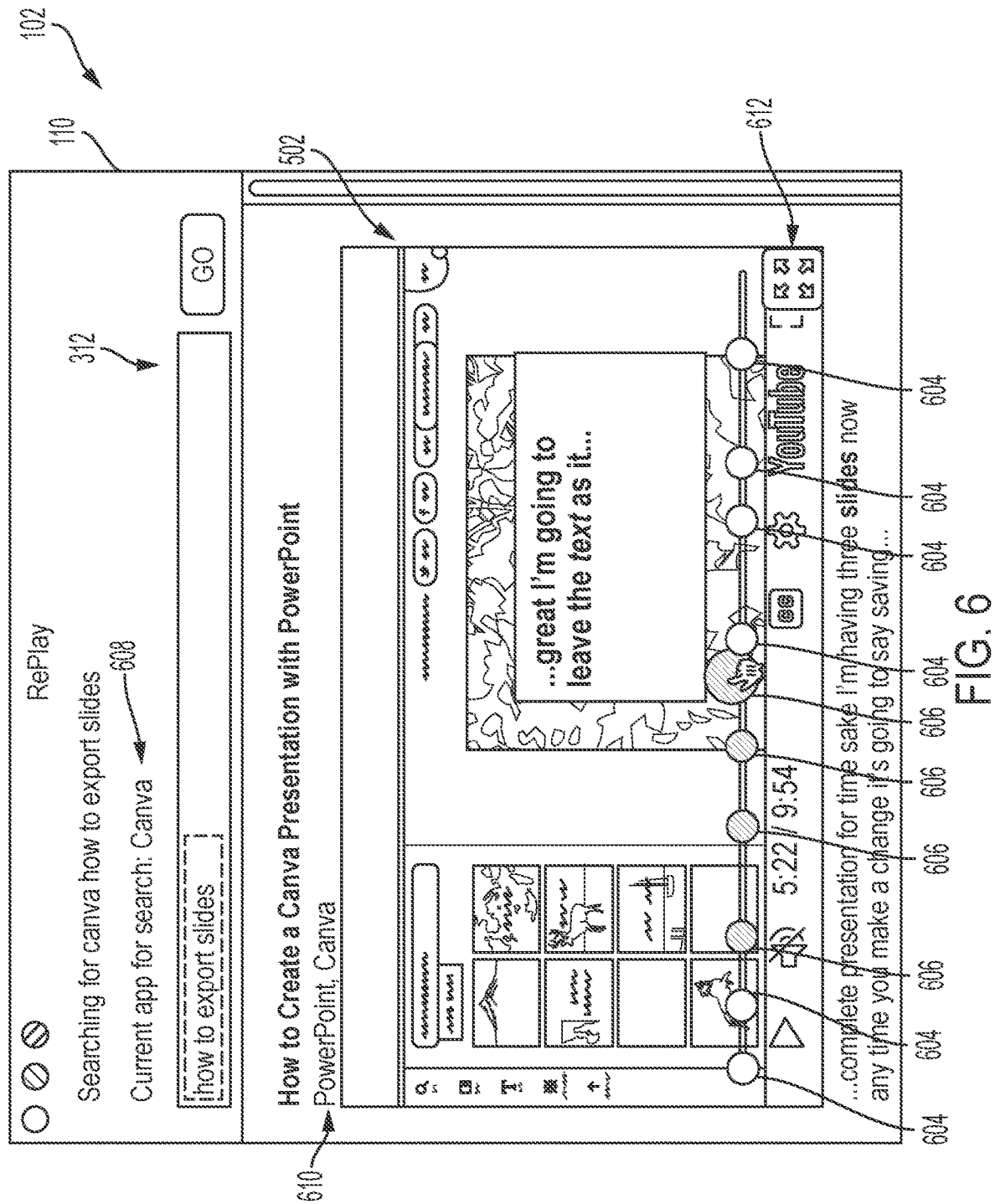
FIG. 6 depicts an additional example of a searching subsystem of the interactive computing system of FIG. 1 displayed on a portion of the user interface of FIG. 1.

FIG. 6 depicts an additional example of the searching subsystem 110 displayed on a portion of the user interface 102. A top video search result 602 based on the video search query 312 is depicted. The top video search result 602 includes marker overlays 604 and 606 to indicate segments of the video where the caption track of the video matches the video search query 312. In an example, the marker overlays 604 represent segments of the top video search result 602 that include caption tracks that match the video search query 312 and an active content creation tool 608 of the computing subsystems 106. Further, the marker overlays 606 represent segments of the top video search result 602 that include caption tracks that match the video search query 312 and a recently active content creation tool 610. For example, the accessibility API tracking subsystem 108 or the searching subsystem 110 track recently active content creation tools 610 and includes the recently active content creation tools 610 as part of the video search query 312. Tracking and searching the recently active content creation tools 610 is particularly useful when users move between computing subsystems 106 and desire video search results relevant to tools of several recently used computing subsystems 106. Further, while the searching subsystem 110 displays the video search results as a small video within the searching subsystem 110, the searching subsystem 110 can include a full-screen button to expand the video search result 602 to the full screen of the user interface 102.

Figure 7:
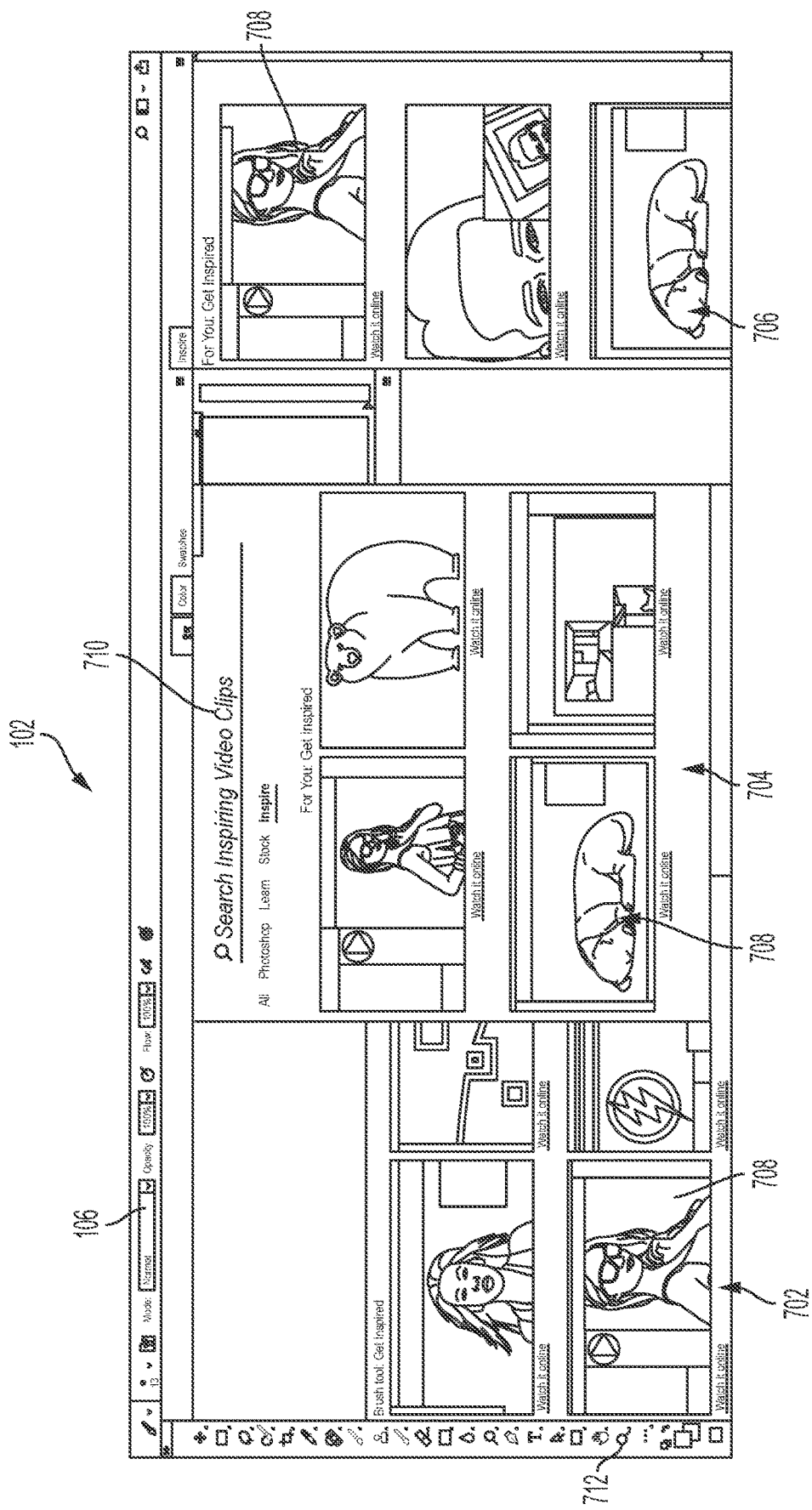
FIG. 7 depicts an example of varying interface modes for the searching subsystem within the user interface of FIG. 1.

FIG. 7 depicts an example of varying interface modes 702, 704, and 706 for the searching subsystem 110 within the user interface 102. In an example, the searching subsystem 110 is displayed in the interface mode 702 as a contextual tool tip. In such an example, the interface mode 702 provides access to the video search results 708 when a user hovers a cursor over a tool icon presented on the user interface 102. Segments of the video search results 708 can begin playing as soon as the tooltip appears on the user interface 102. For example, the searching subsystem 110 generates and presents clips from one or more of the video search results that are shorter than a complete video and cropped to show relevant portions of the video to the video search query 312 and context information associated with the user's interactions with one or more content creation tools.

In another example, the searching subsystem 110 is displayed in the interface mode 704 as an on-demand search window within the active computing subsystem 106. The on-demand search window is accessed to provide the video search results 708 or to access a search bar 710 when a user selects a search element 712 from the computing subsystem 106. The interface mode 704 provides a mechanism for the user interface 102 to avoid clutter associated with a large number of elements displayed within the user interface 102.

The interface mode 706 may provide the searching subsystem 110 as an ambient side panel within the computing subsystem 106. In an additional example, the interface mode 706 may provide the searching subsystem 110 within the user interface 102 but outside of the computing subsystem 106. In either example, the ambient side panel arrangement can update the video search results 708 based on user interactions within the computing subsystem 106 as the user works within the computing subsystem 106. Additionally, to avoid distracting the user during periods of focused work, the interface mode 706 may update the video search results 708 after the user has been idle for a predetermined amount of time. The idleness of the user can signal to the searching subsystem 110 that the user is taking a break or trying to think of new ideas. Additionally, hovering over one of the video search results 708 can trigger the video search result 708 to begin playing.

Figure 8:
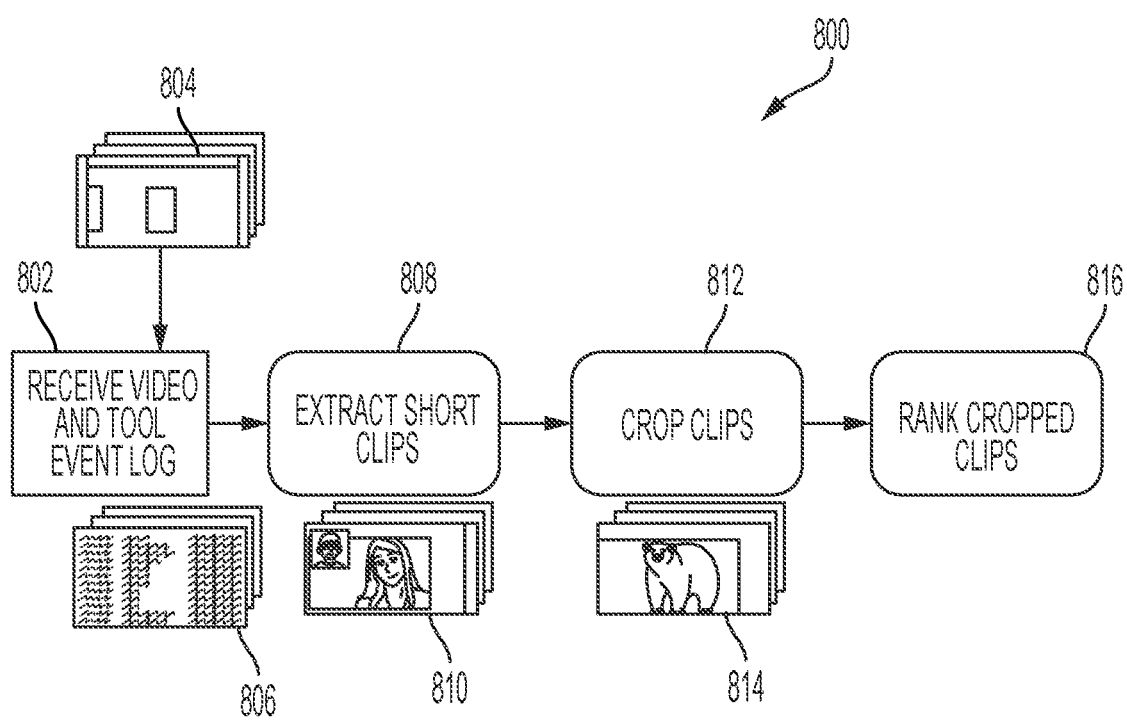
FIG. 8 depicts an example of a process for extracting and ranking clips from a video search result.

FIG. 8 depicts an example of a process 800 for extracting and ranking clips from a video search result. One or more computing devices (e.g., the interactive computing system 100) implement operations depicted in FIG. 8 by executing suitable program code (e.g., the computing subsystems 106, the accessibility API tracking subsystem 108, and the searching subsystem 110). For illustrative purposes, the process 800 is described with reference to certain examples depicted in the figures. Other implementations, however, are possible.

At block 802, the process 800 involves receiving videos 804 relevant to the video search query 312 and tool event logs 806 associated with the videos 804. In this example, each of the videos 804 include usage telemetry (e.g., the tool event logs 806), which indicate time-stamped events for every selection and invocation of a tool of one or more computing subsystems 106 displayed on the user interface 102. The tool event logs 806 provide the searching subsystem 110 with an ability to search the videos 804 with tool event logs 806 in addition to the caption tracks of the videos 804. This additional information is particularly useful in live-stream videos because the videos 804 may not include much or any talking that describes what actions are taken by a user of the active content creation tools in the videos 804 while the user is performing various tasks. Accordingly, the searching subsystem 110 has more data points with which to identify clips of the videos 804 that are relevant to the video search query 312.

At block 808, the process 800 involves extracting clips 810 from the videos 804 that may be relevant to the video search query 312. To extract the short clips, the searching subsystem 110 may group consecutive interactions of a tool on the user interface 102 and a tool selection event if the tool selection event occurred within a predetermined amount of time (e.g., 10 seconds) from the first interaction. In an example, padding (e.g., 2 seconds) is added to a beginning of the clip 810, and the clip can be limited to a specified length (e.g., 25 seconds). In another example where a single tool is used for an extended amount of time, the extracted clip 810 can include a time lapse of a portion of the video 804 to illustrate the changes over the extended time period using the tool.

At block 812, the process 800 involves cropping the clips 810 to generate cropped clips 812. To limit the obtrusiveness of the search results provided by the searching subsystem 110, the clips 810 may be cropped to a different size to focus the cropped clips 814 on areas of the clips 810 that change due to the interactions of the user within the video with tools operated in the video. In some examples, the cropped clips 814 can focus on relevant changes to the clips 810 (e.g., drawings on a canvas) and remove or otherwise ignore less relevant changes to the clips 810 (e.g., panning, zooming). In some instances, moments where artists switch to a different computing subsystem 106 (e.g., to a different tool or application) may be avoided by tracking when more than a specified percentage (e.g., 90%) of pixels within the clip 810 changes. Similarly, the searching subsystem 110 can implement face detection software to detect movement of an artist's camera view in the clips 810 to mask out changes to the clips 810 based on movement of an artist. By masking out the changes to the clips 810 based on artist movement, the searching subsystem 110 avoids cropping the clips 810 to irrelevant portions of the clips 810 like a section corresponding to the artist's camera view.

After removing changes to the clips deemed irrelevant, the searching subsystem 110 may crop the clips 810 to a remaining area where the most changes occur to generate the cropped clips 814. In an example, the searching subsystem 110 may calculate a pixel-wise difference between adjacent frames in the clip 810 and compute an average difference over all of the frames. Portions of the clip 810 are trimmed from sides of the clip 810 where the pixel values in the average difference are less than a threshold amount (e.g., ¼ of a max value of the average difference) to generate the cropped clips 814. This avoids specifying a single crop size because some of the clips 810 are already zoomed in more than other clips.

At block 816, the process 800 involves ranking the cropped clips 814. In an example, the cropped clips 814 are ranked based on time into the original video 804 (e.g., clips closer to an end of the video are more likely to have more relevant content to the video search query 312). The cropped clips 814 may also ranked based on an amount of visual change in the cropped clips 814, where more visual change indicates greater relevance to the video search query 312. The tools used from the computing subsystems 106 also provides a factor to rank the cropped clips 814. For example, the cropped clips 814 may be ranked based on relevance to a current tool in use, relevance to a set of recent tools in use (e.g., the last four tools used), or ranking the cropped clips 814 can be ambivalent to recent tool use. In other examples, the cropped clips 814 are ranked in a manner similar to the process 400 described in FIG. 4.

Example of a Computing System for Implementing Certain Embodiments

Figure 9:
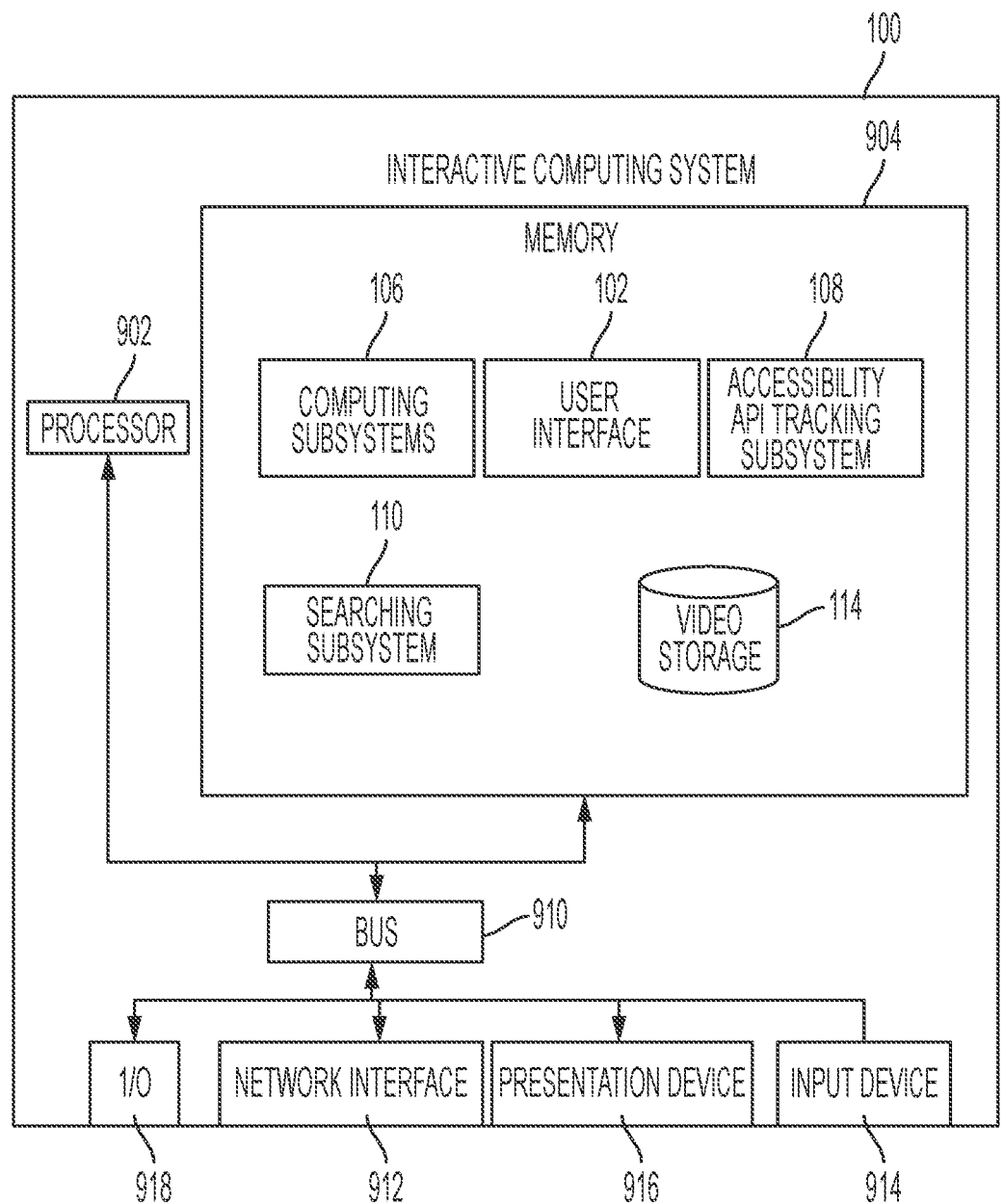
FIG. 9 depicts an example of an interactive computing system for implementing certain embodiments of the present disclosure.

Any suitable computing system or group of computing systems can be used for performing the operations described herein. For example, FIG. 9 depicts an example of the interactive computing system 100. The implementation of interactive computing system 100 could be used for one or more of a performance evaluation system 102, a focal host system 112, and a control host system 122. In other embodiments, a single interactive computing system 100 having devices similar to those depicted in FIG. 9 (e.g., a processor, a memory, etc.) combines the one or more subsystems and data stores depicted as separate systems in FIG. 1.

The depicted example of an interactive computing system 100 includes a processor 902 communicatively coupled to one or more memory devices 904. The processor 902 executes computer-executable program code stored in a memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

A memory device 904 includes any suitable non-transitory computer-readable medium for storing program code, program data, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The interactive computing system 100 executes program code that configures the processor 902 to perform one or more of the operations described herein. Examples of the program code include, in various embodiments, the user interface 102, the computing subsystems 106, the accessibility API tracking subsystem 108, the searching subsystem 110, or other suitable applications that perform one or more operations described herein. The program code may be resident in the memory device 904 or any suitable computer-readable medium and may be executed by the processor 902 or any other suitable processor.

In some embodiments, one or more memory devices 904 stores program data that includes one or more datasets described herein. Examples of these datasets include the video storage 114, interaction data, performance data, etc. In some embodiments, one or more of data sets are stored in the same memory device (e.g., one of the memory devices 904). In additional or alternative embodiments, one or more of the programs and data sets described herein are stored in different memory devices 904 accessible via a data network. One or more buses 910 are also included in the interactive computing system 100. The buses 910 communicatively couples one or more components of a respective one of the interactive computing system 100.

In some embodiments, the interactive computing system 100 also includes a network interface device 912. The network interface device 912 includes any device or group of devices suitable for establishing a wired or wireless data connection to one or more data networks. Non-limiting examples of the network interface device 912 include an Ethernet network adapter, a modem, and/or the like. The interactive computing system 100 is able to communicate with one or more other computing devices via a data network using the network interface device 912.

The interactive computing system 100 may also include a number of external or internal devices, an input device 914, a presentation device 916, or other input or output devices. For example, the interactive computing system 100 is shown with one or more input/output ("I/O") interfaces 918. An I/O interface 914 can receive input from input devices or provide output to output devices. The input device 914 can include any device or group of devices suitable for receiving visual, auditory, or other suitable input that controls or affects the operations of the processor 902. Non-limiting examples of the input device 914 include a touchscreen, a mouse, a keyboard, a microphone, a separate mobile computing device, etc. The presentation device 916 can include any device or group of devices suitable for providing visual, auditory, or other suitable sensory output. Non-limiting examples of the presentation device 916 include a touchscreen, a monitor, a speaker, a separate mobile computing device, etc.

Although FIG. 9 depicts the input device 914 and the presentation device 916 as being local to the computing device that executes the performance evaluation system 102, other implementations are possible. For instance, in some embodiments, one or more of the input device 914 and the presentation device 916 can include a remote client-computing device that communicates with the interactive computing system 100 via the network interface device 912 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
    detecting control of an active content creation tool of an interactive computing system in response to a user input received at a user interface of the interactive computing system, wherein detecting the control of the active content creation tool comprises tracking, using an accessibility application programming interface of the active content creation tool, a sequence of user inputs acting on interactive elements of the active content creation tool;
    automatically updating a video search query based on the tracked sequence of user inputs of the active content creation tool to include context information about the active content creation tool;
    performing a video search of video captions from a video database using the video search query to obtain search results;
    searching video segments of the search results using the video search query to generate video segment search results;
    ranking the video segment search results based on a relevance of each of the video segment search results to the tracked sequence of user inputs of the active content creation tool; and
    providing the ranked video segment search results to the user interface of the interactive computing system.

2. The method of claim 1, wherein performing the video search comprises:
    providing the video search query to a video search engine; and
    receiving the search results from the video search engine relevant to the video search query.

3. The method of claim 1, wherein ranking the video segment search results further comprises:
    comparing text of the video captions in each video segment search result to query text of the video search query and to additional context information about recently active content creation tools, wherein
    ranking the video segment search results is further based on a total number of matches between the text of the video captions and the query text and the additional context information identified while comparing the video captions in each video segment search result to the query text of the video search query.

4. The method of claim 1, wherein searching the video segments is further based on a set of key phrases that are not part of the video search query.

5. The method of claim 1, wherein the context information of the video search query comprises an indication of the active content creation tool and a domain in which the active content creation tool operates.

6. The method of claim 1, wherein providing the video segment search results of the video search to the user interface comprises cropping the video segment search results of the video search to a region of a video of the search results providing changes to the user interface.

7. The method of claim 1, wherein the video database comprises a collection of videos stored locally on the interactive computing system.

8. The method of claim 1, wherein tracking the sequence of user inputs acting on the interactive elements comprises recording accessibility information of the interactive elements receiving the user inputs.

9. The method of claim 1, wherein ranking the video segment search results based on a relevance of each of the video segment search results to the tracked sequence of user inputs of the active content creation tool comprises:
   accessing, for each of the video segment search results, a tool event log comprising a sequence of events comprising selection and/or invocation of tools by the user corresponding to the video segment; and
   comparing, for each of the video segment search results, the respective tool event log to the tracked sequence of user inputs to determine the relevance between the respective video segment search result and the tracked sequence of user inputs.

10. A computing system comprising:
   means for detecting control of an active content creation tool of an interactive computing system in response to a user input received at a user interface of the interactive computing system, wherein detecting the control of the active content creation tool comprises tracking, using an accessibility application programming interface of the active content creation tool, a sequence user inputs acting on interactive elements of the active content creation tool;
   means for automatically updating a video search query based on the tracked user inputs of the active content creation tool to include context information about the active content creation tool and context information about at least one recently active content creation tool;
   means for performing a video search of video captions from a video database using the video search query to obtain search results;
   means for searching video segments of the search results using the video search query to generate video segment search results;
   means for ranking the video segment search results based on a relevance of each of the video segment search results to the tracked sequence of user inputs of the active content creation tool; and
   means for providing the ranked video segment search results to the user interface of the interactive computing system.

11. The computing system of claim 10, wherein performing the video search comprises:
   providing the video search query to a video search engine; and
   receiving the search results from the video search engine relevant to the video search query.

12. The computing system of claim 11, wherein the means for ranking the video segment search results comprises:
   means for comparing text of the video captions in each video segment search result to query text of the video search query and to additional context information about recently active content creation tools,
   wherein ranking the video segment search results is further based on a total number of matches between the text of the video captions and the query text and the additional context information identified while comparing the video captions in each video segment search result to the query text of the video search query.

13. The computing system of claim 10, wherein the context information of the video search query comprises an indication of the active content creation tool and a domain in which the active content creation tool operates.

14. The computing system of claim 10, wherein the means for providing the ranked video segment search results of the video search to the user interface comprises a means for cropping the search results of the video search to a region of a video of the ranked video segment search results providing changes to the user interface.

15. The computing system of claim 10, wherein the video database comprises a collection of videos stored locally on the computing system.

16. The computing system of claim 10, wherein tracking the sequence of user inputs acting on the interactive elements comprises recording accessibility information of the interactive elements receiving the user inputs.

17. A non-transitory computer-readable medium having program code that is stored thereon, the program code executable by one or more processing devices for performing operations comprising:
   detecting control of an active content creation tool of an interactive computing system in response to a user input received at a user interface of the interactive computing system, wherein detecting the control of the active content creation tool comprises tracking, using an accessibility application programming interface of the active content creation tool, a sequence of user inputs acting on interactive elements of the active content creation tool;
   automatically updating a video search query based on the tracked sequence of user inputs of the active content creation tool to include context information about the active content creation tool;
   performing a video search of video captions from a video database using the video search query to obtain search results;
   searching video segments of the search results using the video search query to generate video segment search results;
   ranking the video segment search results based on a relevance of each of the video segment search results to the tracked sequence of user inputs of the active content creation tool; and
   providing the ranked video segment search results to the user interface of the interactive computing system.

18. The non-transitory computer-readable medium of claim 17, wherein performing the video search comprises:
   providing the video search query to a video search engine; and
   receiving the search results from the video search engine relevant to the video search query.

19. The non-transitory computer-readable medium of claim 18, wherein ranking the video segment search results comprises:
   comparing text of the video captions in each video segment search result to query text of the video search query and to additional context information about recently active content creation tools,
   wherein ranking the video segment search results is further based on a total number of matches between the text of the video captions and the query text and the additional context information identified while comparing the video captions in each video segment search result to the query text of the video search query.

20. The non-transitory computer-readable medium of claim 17, wherein searching the video segments of the search results is further based on a set of key phrases that are not part of the video search query.

\* \* \* \* \*